United States Patent [19]

Gold

[11] 4,034,386
[45] July 5, 1977

[54] IMBIBITION CHAMBER ADAPTER FOR SELF-DEVELOPING CAMERA

[75] Inventor: Nicholas Gold, Arlington, Mass.

[73] Assignee: Polaroid Corporation, Cambridge, Mass.

[22] Filed: Apr. 21, 1976

[21] Appl. No.: 679,048

[52] U.S. Cl. .............................. 354/86; 354/275; 354/354
[51] Int. Cl.² ........................................ G03B 17/50
[58] Field of Search ...... 354/86, 83, 288, 275–277, 354/304, 354

[56] References Cited

UNITED STATES PATENTS

| | | | |
|---|---|---|---|
| 3,350,990 | 11/1967 | Finelli et al. | 354/86 |
| 3,653,308 | 4/1972 | Erlichman | 354/86 |
| 3,896,469 | 7/1975 | Mather | 354/86 X |
| 3,938,167 | 2/1976 | Amey et al. | 354/86 |
| 3,996,595 | 12/1976 | Ivester | 354/83 |

*Primary Examiner*—R. L. Moses
*Attorney, Agent, or Firm*—John S. Vale

[57] ABSTRACT

An imbibition chamber adapter configures to be attached to a self-developing camera for receiving a transparency type self-developing film that has been advanced through pressure applying members of the camera.

9 Claims, 8 Drawing Figures

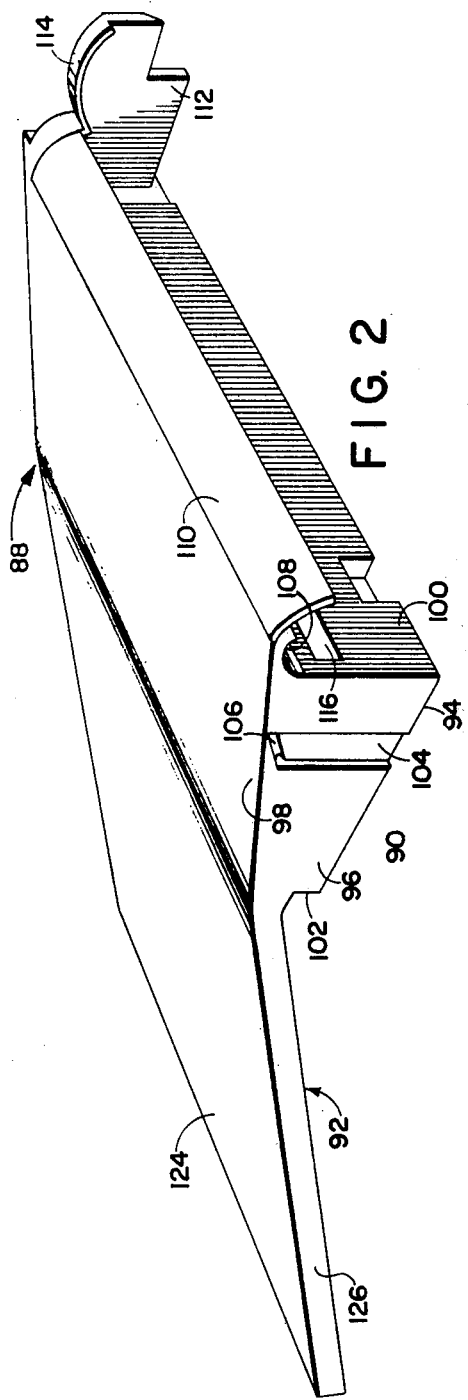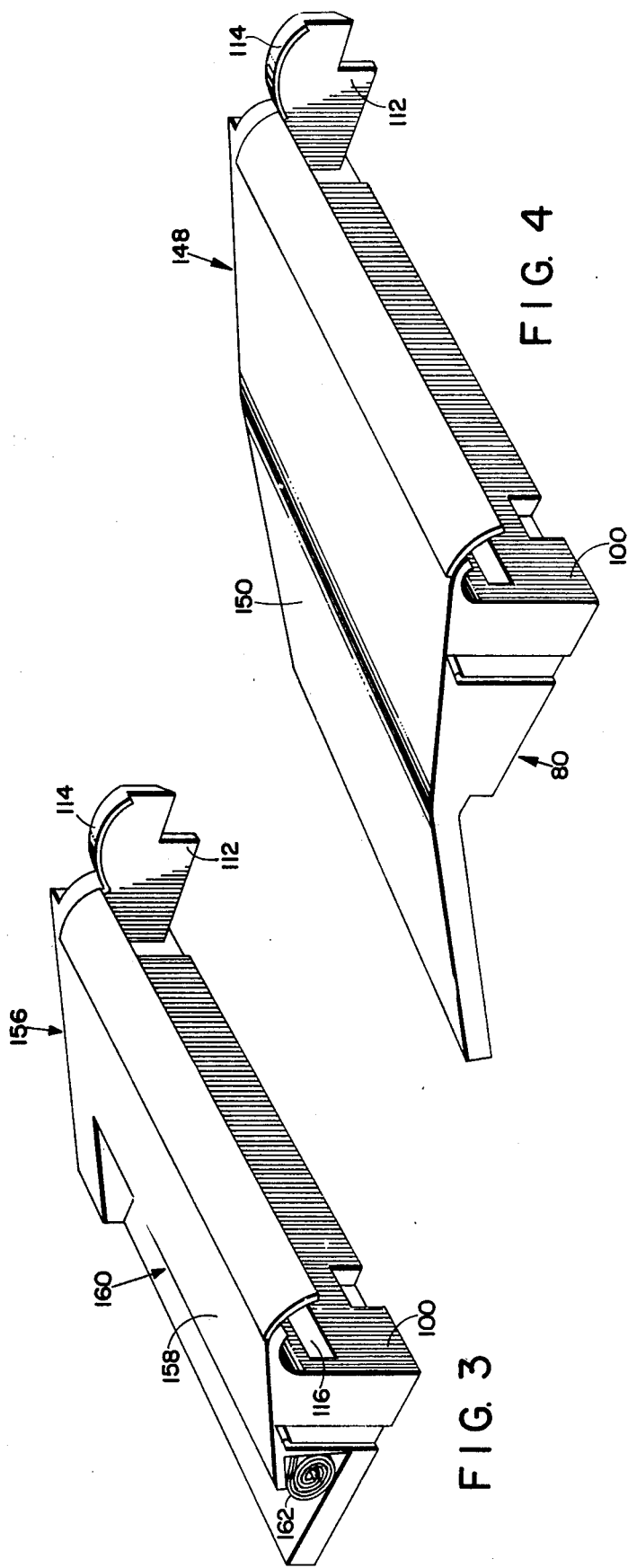

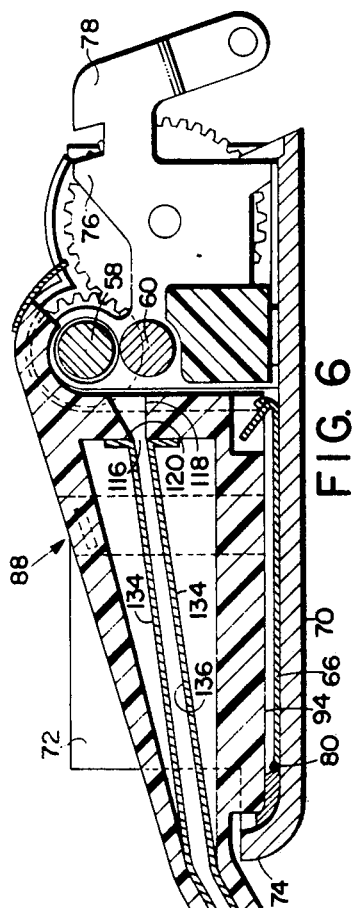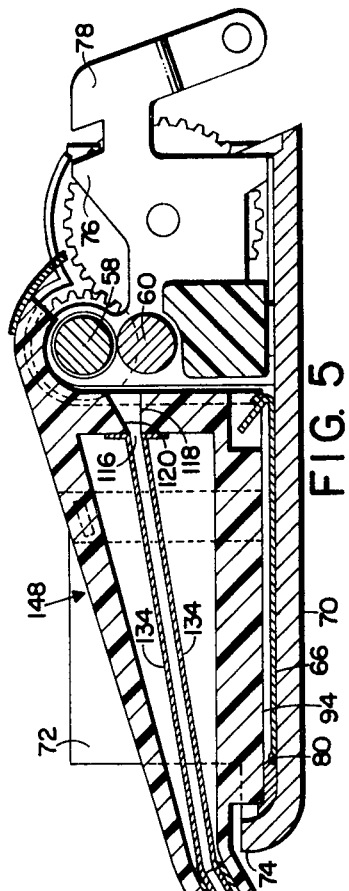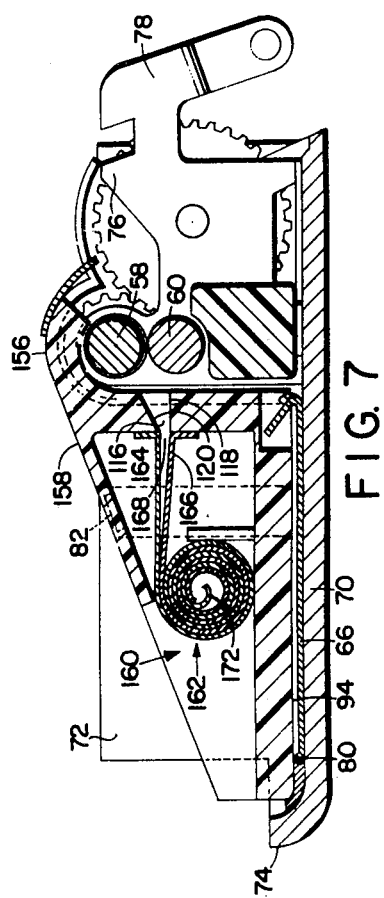

IMBIBITION CHAMBER ADAPTER FOR SELF-DEVELOPING CAMERA

BACKGROUND OF THE INVENTION

1. Field of the Invention

The present invention relates to photography and, more particularly, to an accessory for a self-developing camera.

2. Description of the Prior Art

The present invention provides an accessory adapter which is attachable to a self-developing SX-70 Land Camera for providing a dark chamber or lighttight envelope on the exit side of a pair of pressure-applying rollers, into which a self-developing film unit of the transparency type may be advanced subsequent to the distribution of a fluid processing composition within the film unit. Such film units require a short imbibition period before being subjected to ambient illumination.

The SX-70 camera is designed primarily to expose and process integral self-developing film units or the type which provide a positive image reflection print. An example of this type of film unit may be found in U.S. Pat. No. 3,415,644 issued to E. H. Land on Dec. 10, 1968.

Subsequent to exposure, the reflection print film unit is advanced between a pair of pressure-applying rollers which rupture a pod or container on the film unit holding a fluid processing composition and distribute the fluid between a predetermined pair of layers of the film unit to initiate a development and diffusion transfer process.

Extending forwardly of the rollers is a camera housing section having a film exit slot in a bottom wall portion thereof. Intermediate the exit slot and the exit side of the rollers is a baffle or plate which is pivotally mounted on the bottom wall of the housing section adjacent the exit slot, and is movable between a folded position wherein the plate is located in substantially parallel overlying relationship to the interior surface of the bottom wall and a normal extended position wherein the plate is inclined at approximately a 45° angle to the bottom wall and cooperates with side wall of the housing section and another camera housing section extending forwardly over the top of the rollers to form a lighttight chamber between the exit side of the rollers and the film exit slot. The length of the chamber is shorter than the length of the film unit.

In operation, the film unit advances through the pair or rollers and the leading edge of the film unit engages the erected baffle which deflects or gently bends the film unit from its normal path of travel and guides it to the film exit slot in the bottom wall where it emerges from the camera.

The baffle serves two functions. First, it provides a light free environment between the rollers and film exit slot so that light rays may not impinge a transparent exposure and viewing "window" of the film unit and be transmitted, within the confines of a transparent sheet forming the window, rearwardly to that portion of the film unit on the entrance side of the rollers that has not as yet been covered by the processing fluid. The processing fluid includes an opacification system which prevents ambient light from further exposing or fogging the photosensitive materials within the film unit. The second function of the baffle relates to improving the uniformity of fluid distribution within the film unit. It has been found that by inducing a gentle bend in the film unit as it emerges from the rollers, substantial improvement in reliably obtaining uniform and complete coverage of the photo-exposed area of the film unit is achieved.

For a more detailed explanation of the construction and operation of the baffle, reference may be had to U.S. Pat. No. 3,810,211.

When the trailing end of the film unit has passed through the rollers, approximately one half of the image area of the film unit extends outside of the camera beyond the film exit slot. The film unit may be removed immediately since it is protected from further exposure by the processing fluid.

The previously described camera structure extending forwardly of the pressure rollers is not suitable when transparency type self-developing film units are used in the SX-70 camera because the relatively short dark chamber between the rollers and film exit slot will not accommodate the entire film unit.

The prior art is replete with cameras that include full length dark chambers or light shields in front of the rollers for the purpose of receiving a self-developing film unit. Representative examples may be found in U.S. Pat. Nos. 3,650,188, 3,678,830, and 3,748,990. Also, see copending Ser. No. 466,371, filed on May 2, 1974, for an example of a camera having an extensible coiled light shield that covers over one side of a film unit for a limited period of time.

All of the prior art light shielding arrangements are: (1) intended to be built into the camera; and/or (2) do not completely light shield both sides of the film unit as is required when a transparency film unit is processed.

SUMMARY OF THE INVENTION

The present invention provides an accessory adapter, in the form of a lighttight chamber or expandible lighttight envelope for receiving transparency type self-developing film units, that may be easily attached to SX-70 Land Camera without having to make any modifications thereto.

The adapter features a base section that snaps into place on the housing section of the camera which extends forwardly of the rollers and mounts the inclined baffle. When the adapter is in place, it depresses the normally erect baffle to its folded position such that the baffle and camera film exit slot are not utilized in the film processing phase.

The base section has a film entry slot that is adjacent the bite of the pressure-applying rollers. Just forwardly of the film entrance slot is an inclined surface which serves to provide the previously described film deflecting or bending function to improve the uniformity of fluid distribution.

The film unit proceeds through a passageway within the base section to a forwardly extending dark chamber, extensible structure, or coiled envelope which forms an imbibition chamber for receiving the film unit. Each of the light excluding structures has a film exit slot at the distal end thereof.

In one embodiment, the imbibition chamber is a rigid structure which is capable of receiving the entire film unit. This structure also includes a mechanism for extracting the film unit subsequent to the imbibition period.

In a second embodiment, the imbibition chamber includes first and second sections that are coupled in telescoping fashion for movement between a compact configuration and a fully extended position for receiving the entire film unit.

The imbibition chamber in a third embodiment takes the form of a thin coiled or rolled light opaque envelope that is coupled to the base section in its normally coiled configuration. As the film unit advances through the passageway in the base section and into the open end of the envelope, the film unit unfurls the envelope to its full length. When the film unit is removed, the extended envelope automatically retracts to the coiled position.

Since the light shielding baffle is depressed to the inoperative position by the base section, the adapter includes light shields thereon which prevent light from penetrating into the camera exposure chamber around the rollers and a roller drive gear mechanism.

Therefore, it is an object of the present invention to provide an imbibition chamber adapter or light excluding structure for receiving the full lenght of a self-developing film unit and which may be easily attached and removed from an SX-70 hand camera without having to make modifications thereto.

It is another object to provide such an adapter which includes means thereon for moving a light shielding baffle plate on the forward end of an SX-70 Land Camera to an inoperative position so that the adapter may be readily attached to the camera.

It is yet another object to provide such an adapter that includes structure therein for deflecting a film unit, emerging from the pressure-applying rollers, from its normal path of travel for improving the uniformity of fluid distribution within the film unit.

Other objects of the invention will in part be obvious and will in part appear hereinafter.

BRIEF DESCRIPTION OF THE DRAWINGS

For a fuller understanding of the nature and objects of the invention, reference should be had to the following detailed description taken in connection with the accompanying drawings wherein:

FIG. 2 is a perspective view of a film receiving adapter for the camera of FIG. 1 embodying the features of the present invention;

FIG. 3 is a perspective view of an alternative embodiment of the adapter;

FIG. 4 is a perspective view of yet another alternative embodiment of the adapter;

FIG. 5 is a side sectional view of the adapter shown in FIG. 4 located at its operative position on a forwardly extending housing section of the camera;

FIG. 6 is a side sectional view of the adapter shown in FIG. 2;

FIG. 7 is a side sectional view of the adapter shown in FIG. 3; and

DESCRIPTION OF THE PREFERRED EMBODIMENT

Figure 1:
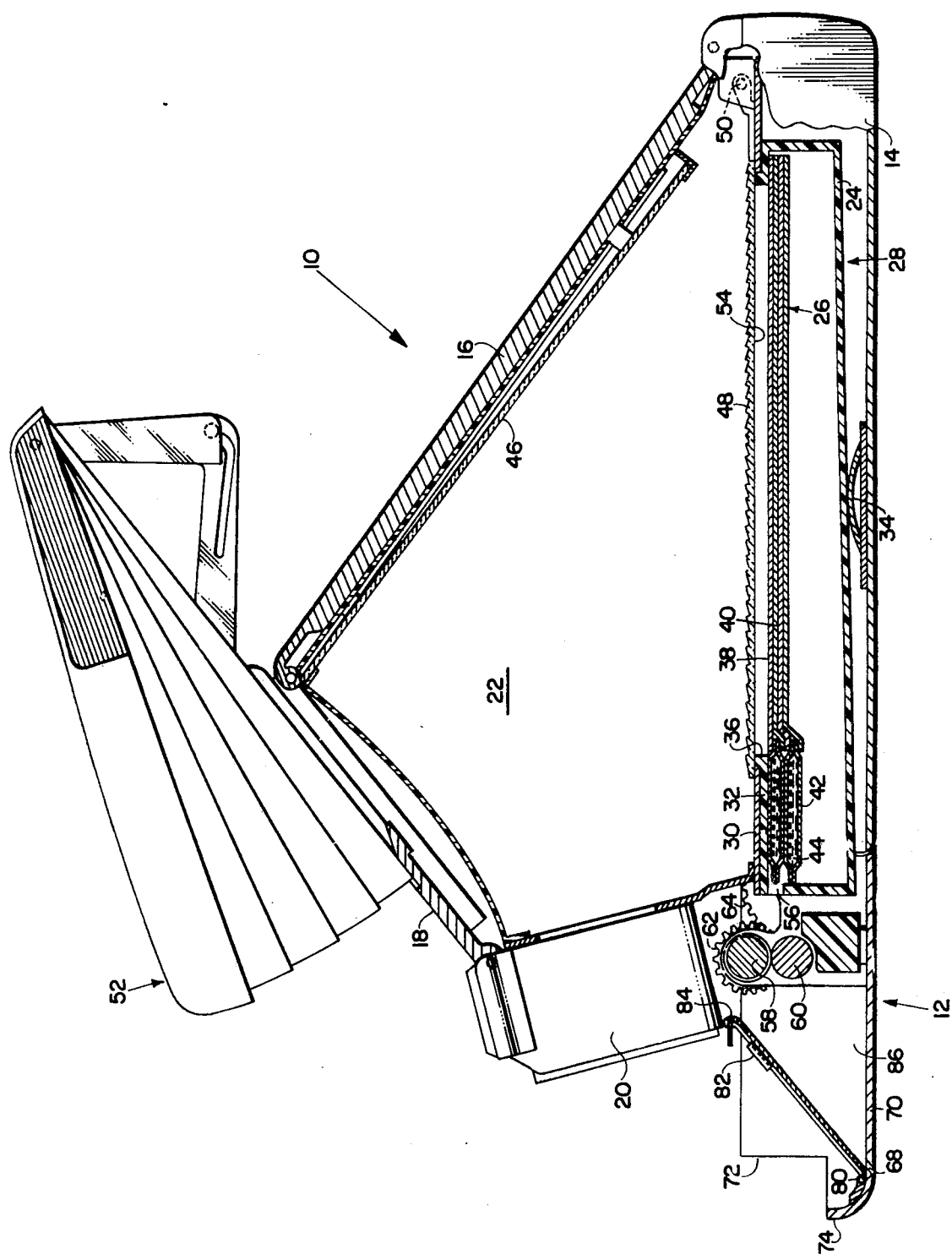
FIG. 1 is a side elevational view, partly in section, of a self-developing camera that is representative of an SX-70 Land Camera.

FIG. 1 of the drawings shows a side sectional view of a compact, folding, highly automated, single lens reflex, self-developing camera 10 that is representative of the SX-70 Land Camera marketed by the Polaroid Corporation, Cambridge, Mass.

Camera 10 is formed by a plurality of interconnected housing sections 12, 14, 16, 18 and 20 and a light excluding bellows 22 and is movable between the erected position shown in FIG. 1 and a compact folded position.

Housing section 12 is pivotally coupled to the open leading end of housing section 14 and may be pivoted downwardly (counterclockwise as viewed in FIG. 1) for loading a film container 24 holding a plurality of integral type self-developing film units 26 into a receiving chamber 28 within housing section 14.

Receiving chamber 28 includes an apertured plate 30 therein against which a forward wall 32 of the film container 24 is urged by a spring 34 to locate the forwardmost film unit 26 in container 24 at the camera exposure plane for exposure by image bearing light transmitted through an exposure aperture 36 in wall 32 of container 24.

The film unit 26 is diagrammatically illustrated as including a pair of superposed sheet-like elements 38 and 40 and a rupturable container 42, holding a supply of fluid processing composition 44 therein, attached to one end of elements 38 and 40.

In actuality, film unit 26 is a multi-layer structure having a plurality of photosensitive layers and one or more image receiving layers. Reflectance print film units are described in detail in U.S. Pat. No. 3,415,644. Examples of transparency type film units may be found in U.S. Pat. Nos. 2,861,885; 2,726,154; 2,944,894; 3,536,488; 3,615,426; 3,615,427, 3,615,428 and 3,615,429.

For the purposes of this disclosure, the significant difference between the reflectance print and transparency type film units is that the transparency unit requires a short imbibition period in a light free environment following fluid distribution whereas the reflectance print type may be ejected from the film exit slot of camera 10 directly into the ambient illumination.

The illustrated camera 10 operates first in a viewing and focusing mode followed by a film exposure and processing mode.

Scene light passes through an objective lens in housing section 20, across an internal chamber defined by bellows 22, to an inclined mirror 46 on the interior surface of housing section 16. From mirror 46 the light is reflected downwardly to a viewing screen 48 on the upper side of a pivotally mounted (at pin 50) reflex member located in covering relation to the aperture in plate 30. An image of the scene to be photographed is formed on screen 48 which is reflective in nature. Light rays from the image on screen 48 are directed to mirror 46 and are reflected therefrom to a viewing device 52 on housing section 18.

Camera 10 is battery energized and includes electronic circuits, a motor, drive train, and other elements not shown for carrying out the following sequence of operations.

In response to actuating a camera cycle start button, a normally open shutter in housing section 18 closes; the reflex member pivots in a clockwise direction, about pin 50, to position a mirror 54 on the underside thereof in front of mirror 46. The shutter reopens for film exposure, via reflection from mirror 54, and is terminated by a light sensing circuit. The exposed film unit 26 is engaged by a film advancing device and is advanced through a slot 56 in the forward end of film container 24 and into the bite between a pair of juxtaposed cylindrical pressure applying rollers 58 and 60 mounted on housing section 12. The top roller 58 has a gear 62 on one end thereof which is in mesh with a roller drive gear 64 for driving the top roller 62 to cause film unit 26 to be advanced between rollers 58 and 60. As the film unit is advanced between the rollers, fluid container 42 is ruptured and the fluid 44 is progressively distributed between a predetermined pair of layers of the film unit represented by the interface between film elements 38 and 40. The leading edge of film unit 26 engages an inclined baffle plate 66 on housing section 12 and is deflected or gently bent from its normal path of travel from the exit side of the rollers and is guided to a film exit slot 68 in a bottom wall 70 of camera housing section 12. When the trailing end of the film unit clears rollers 58 and 60, approximately one half of the film unit 26 extends out of camera 10 through slot 68.

During the film processing phase, the reflex member is returned to the viewing position, the shutter reopens, and various camera mechanisms are reset for the next cycle of operation.

For a more detailed explanation of the operating cycle of camera 10, reference may be had to U.S. Pat. No. 3,774,516.

As best shown in FIGS. 1, 5, 6, 7 and 8 the camera housing section 12 includes a generally planar bottom wall 70, a pair of upstanding lateral sidewalls 72 and a short upturned leading end wall section 74.

The rollers 58 and 60 are rotatably mounted on a roller bracket assembly 76 which is in turn positioned between the lateral sidewalls 72 and is securely fastened to bottom wall 70. A pair of rearwardly extending bracket arms 78 are provided for pivotally connecting the roller mounting bracket 76 (and housing section 12 coupled thereto) to complementary structure (not shown) at the leading end of housing section 14. The roller drive gears 62 and 64 are located outboard of the left hand (as viewed in FIG. 8) side of the bracket assembly 76 and gear 64 is adapted to mesh with a gear at the leading end of a drive train in housing section 14.

Figure 8:
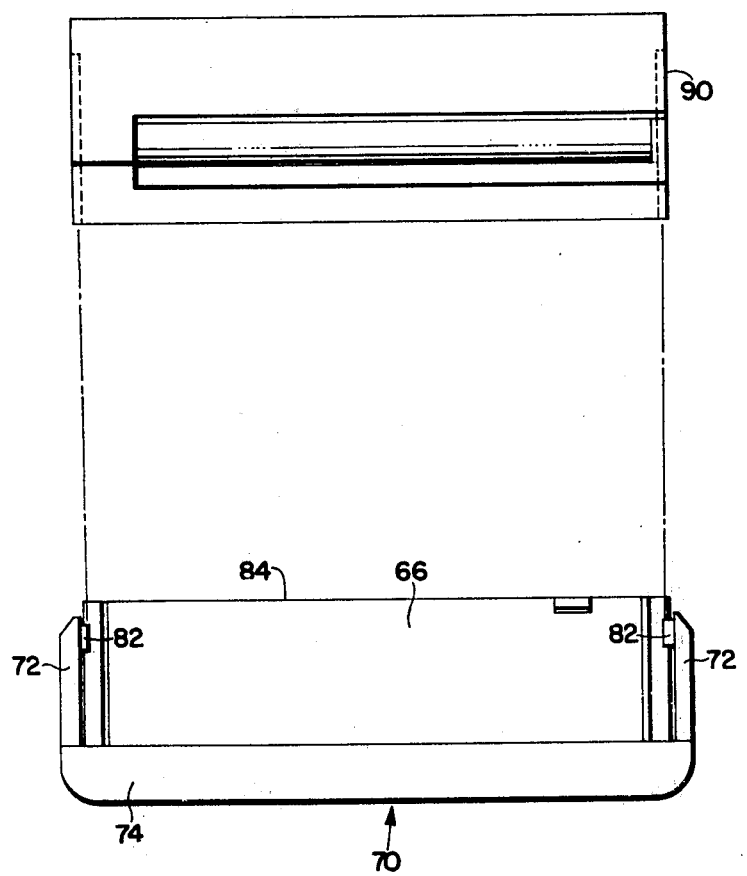
FIG. 8 is a plane view of the camera housing section into which the adapter is adapted to be coupled.

The light opaque baffle plate 66 extends between side walls 72 and is pivotally coupled to the bottom wall 70 at 80 for movement between the extended position of FIGS. 1 and 8 and the folded position of FIGS. 5, 6 and 7.

Baffle plate 66 is biased towards its extended position by a spring (not shown) and a pair of inwardly extending tabs or stops 82 on the interior surfaces of walls 72 limit its upward movement and locate baffle 66 in the operative position. When so located, baffle 66 is at an inclined angle of approximately 45 degrees with respect to bottom wall 70 and a top edge 84 thereof abuts the under side of camera housing section 20 which extends forwardly over the top of the upper roller 58. When camera 10 is folded, housing section 20 pivots into the forward end of housing section 12 and depresses baffle plate 66 to its folded position. When the camera is erected, plate 66 automatically moves to the extended position under the influence of the biasing spring.

When erected plate 66 cooperates with bottom wall 70, side walls 72 and the underside of camera housing section 20 to form a dark chamber 86 between the exit side of the rollers 58 and 60 and the film exit slot 68. Plate 66 is also effective to clock the passage of light around and between rollers 58 and 60 thereby protecting the forwardmost film unit from fogging.

As noted earlier, the length of dark chamber 86 is insufficient to receive the full length of the film unit 26. When the trailing end of the film unit 26 has cleared the rollers, half of the film unit extends outside of the camera 10.

The present invention provides an imbibition chamber adapter which may be coupled to camera housing section 12 without modification thereto and includes means for defining a light excluding chamber for receiving the entire length of a self-developing film unit 26 of the transparency type.

A first embodiment of a suitable adapter is shown in FIGS. 2 and 6 and will be numerically designated 88. Adapter 88 includes rigid base section 90 and a forwardly extending, rigid film chamber section 92. The entire adapter 88 may be formed of any suitable light opaque material such as plastic.

Base section 90 includes generally planar bottom wall 94, a pair of laterally spaced upstanding vertical side walls 96, a downwardly sloping top wall section 98, a trailing end wall 100 and a short leading end wall section 102.

Base section 90 is longitudinally dimensioned, as measured between leading and trailing end walls 102 and 100, to snugly fit into the bottom of camera housing section 12 between the forward wall section 74 and the exit side of the pressure applying rollers. The side walls 96 of adapter 88 are laterally spaced to snugly fit between the interior surfaces if the side walls 72 of housing section 12.

As best shown in FIG. 2, each adapter side wall 96 has a vertically disposed recessed channel 104 therein which terminates at its upper end in a further recessed inclined slot 106.

To couple adapter 88 to housing section 12, the base section 90 is positioned over housing section 12 with bottom wall 94 of the adapter 88 in parallel relation to bottom wall 70 of housing section 12 and the channels 104 in alignment with the baffle stops 82 on the side walls 72 of housing section 12.

As the base section 90 is lowered into place, the bottom wall 94 engages the erected baffle plate 66 and depresses it into its folded position overlying bottom wall 70 of housing section 12. The channels 104 receive the baffle stops 82 therein and serve to guide the adapter 88 into its operative position. It will be noted that the channels 104 are not deep enough to provide full clearance for the stops 82 and passage of the stops 82 is facilitated by the resiliency of the side walls 72 of housing section 12 which are of molded plastic construction. When the base section 90 is fully inserted, the stops 82 snap into the inclined slots 106 at the top of channels 104 to securely latch adapter 88 to camera housing section 12. The resiliency of side walls 72 also allows the adapter 88 to be removed by lifting base section 90 upwardly.

Base section 90 also includes means for light shielding the camera around the rollers 58 and 60. As best shown in FIGS. 2 and 6, the top wall 98 of base section 90 includes a rearwardly extending portion 108 which is rounded to fit over the top roller 58 and a further rearwardly extending flexible light opaque sheet 110 on portion 108 which extends behind the top roller 58. In order to light seal the space between the roller drive gears 62 and 64 and the side wall 72 adjacent thereto, base section 90 is provided with a light shield member 112 that extends rearwardly from trailing end wall 100 of adapter 88 and fits between gears 62 and 64 and side wall 72. Member 112 also includes top section 144 that fits over the top of gears 62 and 64.

Adapter 88 includes a laterally disposed film entry slot 116 in the trailing end wall 100 through which a film unit 26 emerging from the exit side of rollers 58 and 60 enters adapter 88. The entry slot 116 is defined by a lower edge or surface 118 and a spaced upper inclined surface 120 which extends through the normal emerging path of travel of the film unit. As the film unit 26 advances through the rollers 58 and 60, the leading edge thereof engages inclined surface 120 which deflects or gently bends the film unit downwardly for the purpose of improving the uniformity of fluid distribution. Thus inclined surfaces 120 provides the same function as the baffle plate 66 in this regard.

The interior of base section 90 is hollow and the film unit travels therethrough to the forwardly extending chamber section 92 that is in communication with the leading end of base section 90.

Chamber section 92 is defined by a bottom wall section 122, an overlying top wall section 124, a pair of side wall sections 126, and a leading end wall 128 having a film exit slot 130 therein that is covered by a flexible light opaque closure 132. Adapter 88 may optionally include a pair of light opaque flexible sheets 134 which extend from film entry slot 116 into the hollow interior of chamber section 92 to define an interior film passageway 136 within adapter 88 and provide additional light sealing to prevent passage of light between rollers 58 and 60.

It will be noted that the rigid chamber section 92 slopes downwardly from base section 90 at a larger angle than the top wall 98. This is to insure that the forwardly extending chamber section 92 does not intrude into the field of view of the camera objective lens. The exterior surface of top wall 124 preferably has a black matted surface to prevent reflection of light therefrom from a flash unit mounted on camera housing section 20.

In operation, the film unit emerges from the bite of rollers 58 and 60 and passes through entry slot 116 where it is deflected by surface 120. The film unit travels through passageway 136 and into the hollow chamber section 98. The total length of the film path within adapter 88 needs to be only slightly longer than the length of a film unit 26 to insure that the film unit is completely enclosed after the trailing end thereof clears the rollers.

In a preferred embodiment, adapter 88 includes a mechanism for advancing the film unit 26 through the exit 130 subsequent to the imbibition period. As best shown in FIG. 2, the advancing mechanism includes a plate 138 mounted for longitudinal sliding movement in a channel 140 in the interior surface of bottom wall 122 of chamber section 92. Plate 138 is movable by means of a handle 142 that extends through an appropirate slot 144 in wall 122. Extending upwardly from plate 138 are a pair of laterally spaced and forwardly inclined pins 146 which allow the film unit 26 to slide thereover to the end of chamber section 92. The pins 146 engage the lateral margins of the film unit, outside of the bounds of the image forming area, and are effective to advance the film unit through the exit slot 130 when the handle 144 is moved forwardly.

An alternative embodiment of the imbition chamber adapter is shown in FIGS. 4 and 5 and is numerically designated 148. Adapter 148 has essentially the same base section 90 as adapter 88 and common structural elements will carry the same numerical designations in the drawings.

Extending forwardly of base section 90 is a first chamber section 150 which is rigid but of shorter length than section 92 on adapter 88. Located in telescoping fashion within first chamber section 150 is a second chamber section 152. Section 152 is essentially a light opaque envelope formed of a thin plastic sheet material such as Mylar. The entrance end of section 152 is open and the exit end is blocked by a closure flap 154. In a preferred embodiment, the auxiliary light shielding sheets 134 extend into the open end of section 152 to provide light shielding back to the bite of rollers 58 and 60.

In operation, the film unit 26 enters the open end of section 152 and travels therethrough until the leading edge engages closure 154. The film unit then pushes section 152 out of section 150 until the trailing end of the film unit clears the rollers. Stop member (not shown) on the entrance end of section 152 and the distal end of section 150 prevent section 152 from being accidentally pulled completely out of section 150.

To remove the film unit, the sides of the extend section 152 are squeezed together which causes the exit opening to bow out of alignment with the closure flap 154. The user may then reach through the opening to grasp and remove the film unit. The extended section 152 may be manually moved to the retracted position or may be left extended for the next exposure.

The main advantage of adapter 148 over 88 is that it is more compact when section 152 is retracted and is more convenient to carry or store.

A third embodiment of an imbibition chamber adapter that is suitable for use with camera 10 is shown in FIGS. 3 and 7 and carries the numerical designation 156. This adapter 156 includes a base section 90 that has a short top wall 158 which provides an open leading or forward section 160.

The means for defining a light excluding chamber for receiving the transparency film unit 26 includes a coiled envelope 162 formed by top and bottom opaque, resilient sheet elements 164 and 166 that are joined together at their respective lateral margins. Envelope 162 is slightly longer than film unit 26.

The trailing ends of elements 162 and 164 are coupled, by any suitable means, to the interior surface of adapter wall 100 to form an entrance opening 168 of envelope 162 in communication with the entrance opening 116 of adapter 156. When in the coiled or retracted position shown in FIG. 7, envelope 162 is located between the leading end of top wall 158 and bottom wall 94. The longitudinal position of the coiled envelope is determined by an uprigh stop member 170 on bottom wall 94.

In a preferred embodiment elements 164 and 166 of envelope 162 are formed from a sheet of opaque, resilient polyester material, e.g., Mylar, having a thickness of approximately 0.0015 inch. These elements are coiled around a mandrel and heat treated so that their normal unstressed configuration is that of the coil shown in FIG. 7.

In operation, the film unit 26 emerges from the rollers 58 and 60 and passes through opening 116, being deflected by surface 120, and into the coiled envelope 162. The advancing film unit 26 causes envelope 162 to unfurl until it is completely uncoiled when the trailing end of the film unit clears the rollers. The exit end of the envelope is open, but it will be noticed that the top element 164 is slightly longer than bottom element 166 and it curls over the open exit end at 172 to form a closure.

The user unfurls portion 172 and thereby gains access to the exit opening to remove the film unit 26 after the required imbibition period. When extended, envelope 162 is in a stressed condition. As soon as the film unit 26 is removed therefrom, envelope 162 automatically returns to its unstressed or coiled position.

For a more detailed description of the materials and methods of forming envelope 162, reference may be had to U.S. Pat. No. 3,996,595 filed on even date herewith which discloses a camera having a similar coiled envelope attached thereto.

Since certain changes may be made in the imbibition chamber adapters disclosed herein without departing from the scope of the invention herein involved, it is intended that all matter contained in the above description or shown in the accompanying drawings shall be interpreted as illustrative and not in a limiting sense.

What is claimed is:

1. An adapter for providing a lighttight imbibition chamber on a self-developing camera of the type including pressure applying means between which a self-developing film unit is adapted to be advanced to distribute a fluid processing composition within the film unit, a housing section extending forwardly of the pressure applying means, a baffle plate mounted on the housing section forwardly of the pressure applying means of a bottom wall of the housing section and extending laterally between side walls thereof and being mounted for movement between an inoperative position in overlying relation to the bottom wall and a normal operative position wherein the baffle plate is inclined with respect to the bottom wall and extends rearwardly towards the pressure applying means so as to extend into the normal path of travel of a film unit emerging from the pressure applying means for deflecting the film unit from its path of travel to improve the uniformity of fluid distribution within the film unit and for guiding the film unit to a film exit slot in the bottom wall of the housing section, said adapter comprising:
   a hollow base section configured to be operatively located in the camera housing section and including a bottom wall for engaging and depressing the baffle plate from its operative position to its inoperative position and a trailing end wall adapted to be located in alignment with and adjacent to the pressure applying means;
   means defining a film entry slot in said trailing end wall through which a film unit emerging from the pressure applying means enters said base section;
   means adjacent said film entry slot and extending into the normal path of travel of the film unit for deflecting the film unit from its normal path to improve the uniformity of fluid distribution therein;
   means on said base section for defining lighttight chamber for receiving and completely enclosing a film unit that has advanced into said base section and has become disengaged from the pressure applying means;
   means defining a film exit slot in said lighttight chamber; and
   means on said base section fro releasably coupling said adapter to the camera housing section;

2. An adapter as defined in claim 1 wherein said lighttight chamber is defined by a hollow rigid structure extending forwardly of said base section, said rigid structure and said base section being of sufficient combined lingths to accommodate the full length of a film unit therein.

3. An adapter as defined in claim 2 further including means on said rigid structure for advancing a film unit through said film exit slot.

4. An adapter as defined in claim 1 wherein said means defining said lighttight chamber is extensible and retractable for movement between a compact retracted position wherein the combined lengths of said base section and lighttight chamber is insufficient to accommodate the full length of a film unit and an extended position wherein the combined lengths of said base section and lighttight chamber is sufficient to accommodate the full length of a film unit.

5. An adapter as defined in claim 4 wherein said means for defining said lighttight chamber includes a first chamber section extending forwardly from said base section and a second chamber section coupled to said first section in telescoping fashion for movement relative thereto between said retracted and extended positions.

6. An adapter as defined in claim 4 wherein said means for defining said lighttight chamber includes a light opaque, resilient, coiled envelope coupled to said base section in its normally coiled condition and being movable to an extended position therefrom in response to a film unit being advanced thereinto.

7. An adapter as defined in claim 6 wherein said envelope is configured to automatically return from the entended position to the coiled position when a film unit is removed from said extended envelope.

8. An adapter as defined in claim 1 further including means extending rearwardly from said trailing end wall of said base section for light sealing areas of the camera around the pressure applying means.

9. An adapter as defined in claim 1 wherein the baffle plate on the camera housing is biased towards its extended position and the housing section further includes a pair of stops on the side walls thereof for locating the baffle plate in the extended position and said base section further includes a pair of lateral side walls each having a recessed quide channel therein for receiving one of the stops to guide the base section into the camera housing section, each of said guide channels further including a recessed slot therein into which the stop is adapted to extend to releasably couple said adapter to the camera housing section.

* * * * *